United States Patent
Asano et al.

(10) Patent No.: US 7,516,421 B2
(45) Date of Patent: Apr. 7, 2009

(54) INFORMATION PRESENTATION SYSTEM OF VISUAL FIELD AGREEMENT TYPE, AND PORTABLE INFORMATION TERMINAL AND SERVER FOR USE IN THE SYSTEM

(75) Inventors: Takeo Asano, Kunitachi (JP); Takao Shibasaki, Tokyo (JP); Yuichiro Akatsuka, Tama (JP); Mikihiko Terashima, Hachioji (JP)

(73) Assignee: Olympus Corporation, Tokyo (JP)

( * ) Notice: Subject to any disclaimer, the term of this patent is extended or adjusted under 35 U.S.C. 154(b) by 1127 days.

(21) Appl. No.: 10/443,932

(22) Filed: May 22, 2003

(65) Prior Publication Data

US 2004/0046779 A1 Mar. 11, 2004

(30) Foreign Application Priority Data

May 24, 2002 (JP) ............................ 2002-151161
Apr. 4, 2003 (JP) ............................ 2003-101644

(51) Int. Cl.
*G06F 3/048* (2006.01)
(52) U.S. Cl. ....................... 715/850; 715/851; 715/852
(58) Field of Classification Search ................ 715/723, 715/724, 725, 726, 716, 757, 852, 799, 800, 715/802, 850, 851, 859, 864; 348/207.1, 348/14.02
See application file for complete search history.

(56) References Cited

U.S. PATENT DOCUMENTS

| | | | |
|---|---|---|---|
| 5,765,561 A * | 6/1998 | Chen et al. ................ | 600/407 |
| 6,535,243 B1 * | 3/2003 | Tullis ...................... | 348/207.1 |
| 6,577,249 B1 | 6/2003 | Akatsuka et al. | |
| 6,919,892 B1 * | 7/2005 | Cheiky et al. ............. | 345/473 |
| 7,206,804 B1 * | 4/2007 | Deshpande et al. ......... | 709/203 |

(Continued)

FOREIGN PATENT DOCUMENTS

DE 202 03 367 U1 6/2003

(Continued)

OTHER PUBLICATIONS

A. Takahashi et al., "A High Accuracy Realtime 3D Measuring Method of Marker for VR Interface by Monocular Vision", *3D Image Conference '96 Proceeding*, pp. 67-172 (1996).

(Continued)

*Primary Examiner*—Weilun Lo
*Assistant Examiner*—Truc T Chuong
(74) *Attorney, Agent, or Firm*—Scully, Scott, Murphy & Presser P.C.

(57) ABSTRACT

A plurality of known markers is disposed in a specific district. A marker detection section detects the known markers existing in the image photographed by an image pickup device. A position/orientation relation calculation section identifies the detected known marker to calculate position and orientation relations between the identified known marker and the image pickup device. An associated information obtaining section obtains predetermined information associated with the identified known marker. An information processing section processes the obtained predetermined information based on the calculated position and orientation relations. A display device superimposes and displays the processed information on the photographed image. At least the image pickup device and display device are disposed in a portable information terminal, and the other sections are disposed in a server which can perform radio communication with the portable information terminal.

22 Claims, 5 Drawing Sheets

U.S. PATENT DOCUMENTS

2003/0210335 A1* 11/2003 Carau et al. .............. 348/231.2

FOREIGN PATENT DOCUMENTS

| EP | 1 117 074 A | 7/2001 |
|----|-------------|--------|
| JP | 2001-118187 | 4/2001 |
| JP | 2001-126021 | 5/2001 |
| JP | 2001-126051 | 5/2001 |

OTHER PUBLICATIONS

U. Neumann et al., "Augmented Reality Tracking in Natural Environments", *Mixed Reality*, Chapter 6, pp. 101-130 (1999).

Liu, Peiran et al., "Designing Real-Time Vision Based Augmented Reality Environments for 3D Collaborative Applications", Proceedings of the 2002 IEEE Canadian Conference on Electrical & Computer Engineering (2002), pp. 715-720.

Piekarski, Wayne et al., "Tinmith-Metro: New Outdoor Techniques for Creating City Models with an Augmented Reality Wearable Computer", Proceedings of the 5th International Symposium on Wearable Computers (2001), pp. 31-38.

Argotti, Yann et al., "Dynamic Superimposition of Synthetic Objects on Rigid and Simple-deformable Real Objects", Proceedings of the IEEE and ACM International Symposium on Augmented Reality (2001), pp. 5-10.

Geiger, Christian et al., "Mobile AR4ALL", Proceedings of the IEEE and ACM International Symposium on Augmented Reality (2001), pp. 181-182.

Gleue, Tim et al., "Design and Implementation of a Mobile Device for Outdoor Augmented Reality in the Archeoguide Project", Proceedings of the 2001 Conference on Virtual Reality, Archeology, and Cultural Heritage (2001), pp. 161-168.

Kosaka, Akio et al., "Augmented Reality System for Surgical Navigation Using Robust Target Vision", Proceedings of the 2000 IEEE Conference on Computer Vision and Pattern Recognition (2000), p. 187-194.

Grasping Position of Employee Using Tokyo Zerox PHS & Reducing Movement Time in Visit For Repair, Nikkei Communication, Nikkei Business Publications, Inc., 277:203-208 (1998).

Takahiro Kudo, "How Can PHS Position Information System Be Utilized?", Electronics, Ohmsha, Ltd., 43(11):16-18 (1998).

"Trend of Research and Development of Next-Generation Map Application Technique", NTT Technical Journal, The Institute of Electronics, Information and Communication Engineers, Dec. 1, 2000, vol. 12, No. 12, pp. 42 to 49.

* cited by examiner

INFORMATION PRESENTATION SYSTEM OF VISUAL FIELD AGREEMENT TYPE, AND PORTABLE INFORMATION TERMINAL AND SERVER FOR USE IN THE SYSTEM

CROSS-REFERENCE TO RELATED APPLICATIONS

This application is based upon and claims the benefit of priority from the prior Japanese Patent Applications No. 2002-151161, filed May 24, 2002; and No. 2003-101644, filed Apr. 4, 2003, the entire contents of both of which are incorporated herein by reference.

BACKGROUND OF THE INVENTION

1. Field of the Invention

The present invention relates to a visual field agreement type information presentation system in which information related to an image photographed by image pickup means is superimposed on the photographed image and simultaneously displayed in a limited specific district and in which the information can be presented at a high density by an image observer, and a portable information terminal and server for use in the system.

2. Description of the Related Art

A calculation technique using a plurality of markers to obtain position and orientation information of image pickup means has heretofore been proposed.

For example, in Jpn. Pat. Appln. KOKAI Publication No. 2001-126051,a method is proposed comprising: reading information included in a reference marker in order to obtain a schematic position and orientation of an image acquisition section, so that positions of the reference marker and a marker disposed around the reference marker and/or a characteristic point can be confirmed. According to the technique disclosed in the publication, the positions of four or more markers and/or the characteristic point are confirmed, and this information can be used to estimate the position and orientation of the image pickup means.

Moreover, a method of obtaining the position/orientation of the image pickup means from the reference marker position is disclosed in "A High Accuracy Realtime 3D Measuring Method of Marker for VR Interface by Monocular Vision" (3D Image Conference '96 Proceeding pp. 67-172,Akira Takahashi, Ikuo Ishii, Hideo Makino, Makoto Nakashizuka, 1996). That is, assuming in FIG. 1 that $O_c$ is a visual point, $p_0$ is a projected image diagonal line intersection, and $P_0$ is a rectangle diagonal image intersection, x' is obtained so as to minimize:

$$F(x') = 4 - \sum_{i=1}^{4} (n_i n_i')^2$$

so that the orientation of the image pickup means is obtained. It is to be noted that here a variable vector x' is $x'=(\alpha_1'\beta_1', \alpha_2')$. For the position of the image pickup means, minimum square estimation of d for minimizing a distance between $O_{cpi}$ and vertex $P_i$ is performed.

$$d = \frac{(s_0 s_i)(s_i w_i) - (s_0 w_i)}{1 - (s_0 s_i)^2} D$$

Next, the position of the image pickup means can be determined by an average of depth values obtained from the respective vertices.

Moreover, in "Mixed Reality" (ISBN 4-274-90283-8 Ohmsha, Ltd.) Chapter 6:"Augmented Reality Tracking in Natural Feature Environments" U. Nehmann, S. You, Y. Cho, J. Lee and J. Park 1999 p.101-130,a known reference point called a "Fiducial Mark" is used to obtain an initial position of the image pickup means. In this case, a plurality of characteristic points is extracted to obtain a projected position in an input image. The characteristic point is tracked in response to movement of an input device, and an optimum solution of the position of the image pickup means is obtained.

On the other hand, many attractions or exhibits are usually scattered in specific districts such as an amusement park, theme park, and museum. Therefore, to directly visit the objective attraction or exhibit, a general visitor employs a method of consulting a booklet map distributed by a company managing the specific district or a guide map in a main passageway to search a destination.

Moreover, for shopping in a souvenir shop in the specific district, it is usual to visit the shop and to buy articles over the counter. In recent years, information indicating the shop and the articles dealt in by the shop can be obtained beforehand by guidebooks, but in actual the articles are usually bought only over the counter.

BRIEF SUMMARY OF THE INVENTION

According to a first aspect of the present invention, there is provided an information presentation system, comprising:

a plurality of known markers distributed in a specific district which is an object of the system;

an image pickup device configured to photograph an image;

a marker detection section configured to detect the known markers existing in the image photographed by the image pickup device;

a position/orientation relation calculation section configured to identify the known marker detected by the marker detection section to calculate position and orientation relations between the identified known marker and the image pickup device;

an associated information obtaining section configured to obtain predetermined information associated with the known marker identified by the position/orientation relation calculation section;

an information processing section configured to process the predetermined information obtained by the associated information obtaining section based on the position and orientation relations calculated by the position/orientation relation calculation section; and a display device configured to superimpose and display the information processed by the information processing section on the image photographed by the image pickup device, wherein at least the image pickup device and display device are disposed in a portable information terminal, and the other sections are disposed in a server which performs radio communication with the portable information terminal.

According to a second aspect of the present invention, there is provided a portable information terminal comprising:

an image pickup device configured to photographs an image;

a marker detection section configured to detect a known marker existing in the image photographed by the image pickup device;

a position/orientation relation calculation section configured to identify the known marker detected by the marker detection section in a plurality of known markers disposed in a specific district to calculate a position and orientation relations between the identified known marker and the image pickup device;

an associated information obtaining section configured to obtain predetermined information associated with the known marker identified by the position/orientation relation calculation section;

an information processing section configured to process the predetermined information obtained by the associated information obtaining section based on the position and orientation relations calculated by the position/orientation relation calculation section; and a display device configured to superimpose and display the information processed by the information processing section on the image photographed by the image pickup device.

According to a third aspect of the present invention, there is provided a portable information terminal comprising:

an image pickup device configured to photograph an image, the image pickup device radio-transmitting the photographed image to a server and allowing the server to perform a function of identifying a known marker existing in the transmitted image in a plurality of known markers distributed in a specific district to calculate position and orientation relations between the identified known marker and the image pickup device and a function of obtaining predetermined information associated with the identified known marker to process the information based on the calculated position and orientation relations; and a display device configured to radio-receive the processed predetermined information from the server and to superimpose and display the information on the image photographed by the image pickup device.

According to a fourth aspect of the present invention, there is provided a portable information terminal comprising:

an image pickup device configured to photograph an image;

a marker detection section configured to detect presence of any of a plurality of known markers distributed in a specific district from the image photographed by the image pickup device, the marker detection section radio-transmitting the image of a portion corresponding to the known marker to a server and allowing the server to perform a function of identifying the known marker in the transmitted image to calculate position and orientation relations between the identified known marker and the image pickup device and a function of obtaining predetermined information associated with the identified known marker to process the information based on the calculated position and orientation relations; and a display device configured to radio-receive the processed predetermined information from the server and to superimpose and display the information on the image photographed by the image pickup device.

According to a fifth aspect of the present invention, there is provided a portable information terminal comprising:

an image pickup device configured to photograph an image, the image pickup device radio-transmitting the photographed image to a server and which allows the server to perform a function of identifying a known marker existing in the transmitted image in a plurality of known markers distributed in a specific district to calculate position and orientation relations between the identified known marker and the image pickup device and a function of obtaining predetermined information associated with the identified known marker;

an information processing section configured to radio-receive the position and orientation relations and the predetermined information from the server to process the predetermined information based on the position and orientation relations; and a display device configured to superimpose and display the information processed by the information processing section on the image photographed by the image pickup device.

According to a sixth aspect of the present invention, there is provided a portable information terminal comprising:

an image pickup device configured to photographing an image;

a marker detection section configured to detect presence of any of a plurality of known markers distributed in a specific district from the image photographed by the image pickup device;

a position/orientation relation calculation section configured to identify the known marker detected by the marker detection section to calculate position and orientation relations between the identified known marker and the image pickup device, the position/orientation relation calculation section radio-transmitting the identified known marker and the calculated position and orientation relations to a server and allowing the server to perform a function of obtaining predetermined information associated with the transmitted known marker to process the information based on the transmitted position and orientation relations; and a display device configured to radio-receive the processed predetermined information from the server and to superimpose and display the information on the image photographed by the image pickup device.

According to a seventh aspect of the present invention, there is provided a portable information terminal comprising:

an image pickup device configured to photograph an image;

a marker detection section configured to detect presence of any of a plurality of known markers distributed in a specific district from the image photographed by the image pickup device, the marker detection section radio-transmitting the image of a portion corresponding to the known marker to a server and allowing the server to perform a function of identifying the known marker in the transmitted image to calculate position and orientation relations between the identified known marker and the image pickup device and a function of obtaining predetermined information associated with the identified known marker;

an information processing section configured to radio-receive the position and orientation relations and the predetermined information from the server to process the predetermined information based on the position and orientation relations; and a display device configured to superimpose and display the information processed by the information processing section on the image photographed by the image pickup device.

According to an eighth aspect of the present invention, there is provided a portable information terminal comprising:

an image pickup device configured to photograph an image;

a marker detection section configured to detect presence of any of a plurality of known markers distributed in a specific district from the image photographed by the image pickup device;

a position/orientation relation calculation section configured to identify the known marker detected by the marker detection section to calculate position and orientation relations between the identified known marker and the image pickup device;

an associated information obtaining section configured to obtain predetermined information associated with the known marker identified by the position/orientation relation calculation section, the associated information obtaining section radio-transmitting the obtained predetermined information to a server together with the position and orientation relations calculated by the position/orientation relation calculation section and allowing the server to process the transmitted predetermined information based on the transmitted position and orientation relations; and a display device configured to radio-receive the processed predetermined information from the server and to superimpose and display the information on the image photographed by the image pickup device.

According to a ninth aspect of the present invention, there is provided a portable information terminal comprising:

an image pickup device configured to photograph an image;

a marker detection section configured to detect presence of any of a plurality of known markers distributed in a specific district from the image photographed by the image pickup device;

a position/orientation relation calculation section configured to identify the known marker detected by the marker detection section to calculate position and orientation relations between the identified known marker and the image pickup device, the position/orientation relation calculation section radio-transmitting an identification result of the known marker to a server and allowing the server to obtain predetermined information associated with the transmitted identified known marker;

an information processing section configured to radio-receive the predetermined information from the server to process the information based on the position and orientation relations calculated by the position/orientation relation calculation section; and a display device configured to superimpose and display the information processed by the information processing section on the image photographed by the image pickup device.

According to a tenth aspect of the present invention, there is provided an information presentation system comprising:

an image input section configured to acquire an observation image;

a marker extraction section configured to extract a specific marker photographed in the observation image acquired by the image input section;

an orientation calculation section configured to use the specific marker extracted by the marker extraction section to calculate orientation information of the image input section;

an information presentation section configured to present predetermined information based on the orientation information calculated by the orientation calculation section; and a contents storage section configured to store the information to be presented as the predetermined information.

According to an eleventh aspect of the present invention, there is provided an information presentation system comprising:

an image input section configured to acquire an observation image;

a marker design identification section configured to identify design of a specific marker photographed in the observation image acquired by the image input section;

a position calculation section configured to calculate position information of the image input section from the design of the specific marker identified by the marker design identification section;

an information presentation section configured to present predetermined information based on the position information calculated by the position calculation section; and a contents storage section configured to store the information to be presented as the predetermined information.

According to a twelfth aspect of the present invention, there is provided an information presentation system comprising:

an image input section configured to acquire an observation image;

a marker extraction section configured to extract a specific marker photographed in the observation image acquired by the image input section;

a marker design identification section configured to identify design included in the specific marker extracted by the marker extraction section;

a position/orientation calculation section configured to calculates position and orientation information of the image input section from the specific marker extracted by the marker extraction section and the design of the specific marker identified by the marker design identification section;

an information presentation section configured to present predetermined information based on the position and orientation information calculated by the position/orientation calculation section; and a contents storage section configured to store the information to be presented as the predetermined information.

According to a thirteenth aspect of the present invention, there is provided a portable information terminal comprising:

a display section configured to display information;

a marker extraction section configured to receive an observation image acquired by an image input section attached to or disposed in the portable information terminal to extract a specific marker photographed in the observation image;

an orientation calculation section configured to use the marker extracted by the marker extraction section to calculate orientation information of the image input section;

an information presentation section configured to display predetermined information based on orientation information calculated by the orientation calculation section in the display section to present the predetermined information; and a contents storage section configured to store the information to be presented as the predetermined information.

According to a fourteenth aspect of the present invention, there is provided a portable information terminal comprising:

a display section configured to display information;

a marker design identification section configured to receive an observation image acquired by an image input section attached to the portable information terminal or disposed in the portable information terminal to identify design of a specific marker photographed in the observation image;

a position calculation section configured to calculate position information of the image input section from the design of the specific marker identified by the marker design identification section;

an information presentation section configured to display predetermined information based on the position information calculated by the position calculation section in the display section to present the predetermined information; and a contents storage section configured to store the information to be presented as the predetermined information.

According to a fifteenth aspect of the present invention, there is provided a portable information terminal comprising:

a display section configured to display information;

a marker extraction section configured to receive an observation image acquired by an image input section attached to the portable information terminal or disposed in the portable information terminal to extract a specific marker photographed in the observation image;

a marker design identification section configured to identify design included in the specific marker extracted by the marker extraction section;

a position/orientation calculation section configured to calculate position and orientation information of the image input section from the specific marker extracted by the marker extraction section and the design of the specific marker identified by the marker design identification section;

an information presentation section configured to display predetermined information based on the position and orientation information calculated by the position/orientation calculation section in the display section to present the predetermined information; and a contents storage section configured to store the information to be presented as the predetermined information.

According to a sixteenth aspect of the present invention, there is provided a server which is able to be connected to a portable information terminal including a display section by communication, comprising at least one of:

a marker extraction section configured to extract a specific marker photographed in an observation image acquired by an image input section attached to the portable information terminal or disposed in the portable information terminal;

an orientation calculation section configured to use the marker extracted by the marker extraction section to calculate orientation information of the image input section;

an information presentation section configured to display predetermined information based on the orientation information calculated by the orientation calculation section in the display section of the portable information terminal to present the predetermined information; and a contents storage section configured to store information to be presented as the predetermined information, wherein the server transmits and receives necessary information with one of the portable information terminal including the sections excluding the sections disposed in the server and the sections of another server.

According to a seventeenth aspect of the present invention, there is provided a server which is able to be connected to a portable information terminal including a display section by communication, comprising at least one of:

a marker design identification section configured to identify design of a specific marker photographed in an observation image acquired by an image input section attached to the portable information terminal or disposed in the portable information terminal;

a position calculation section configured to calculate position information of the image input section from the design of the specific marker identified by the marker design identification section;

an information presentation section configured to display predetermined information based on the position information calculated by the position calculation section in the display section of the portable information terminal to present the predetermined information; and a contents storage section configured to store information to be presented as the predetermined information, wherein the server transmits and receives necessary information with one of the portable information terminal including the sections excluding the sections disposed in the server and the sections of another server.

According to an eighteenth aspect of the present invention, there is provided a server which is able to be connected to a portable information terminal including a display section by communication, comprising at least one of:

a marker extraction section configured to extract a specific marker photographed in an observation image acquired by an image input section attached to the portable information terminal or disposed in the portable information terminal;

a marker design identification section configured to identify design included in the specific marker extracted by the marker extraction section;

a position/orientation calculation section configured to calculate position and orientation information of the image input section from the specific marker extracted by the marker extraction section and the design of the specific marker identified by the marker design identification section;

an information presentation section configured to display predetermined information based on the position and orientation information calculated by the position/orientation calculation section in the display section of the portable information terminal to present the predetermined information; and a contents storage section configured to store information to be presented as the predetermined information, wherein the server transmits and receives necessary information with one of the portable information terminal including the sections excluding the sections disposed in the server and the sections of another server.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter with reference to the drawings.

FIRST EMBODIMENT

Figure 1:
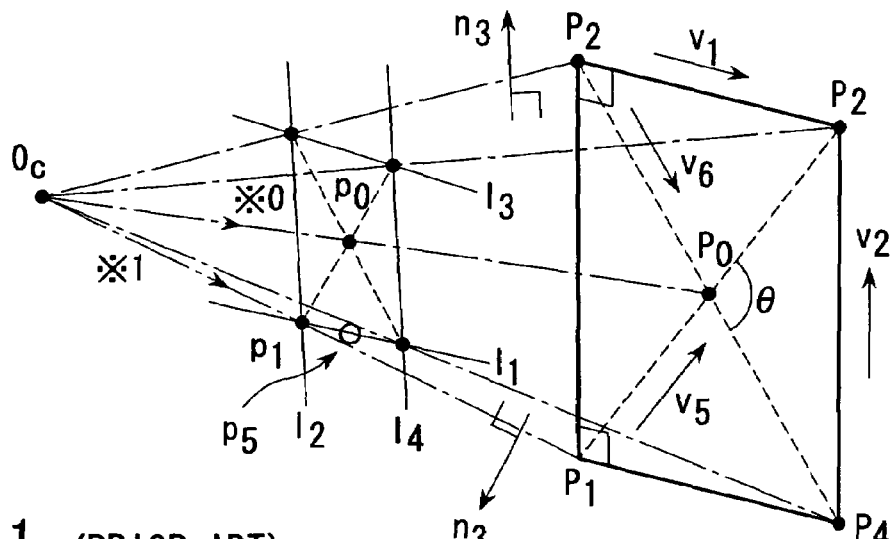
FIG. 1 is an explanatory view of a prior-art method of obtaining position and orientation of image pickup means from a reference marker position.
Figure 2:
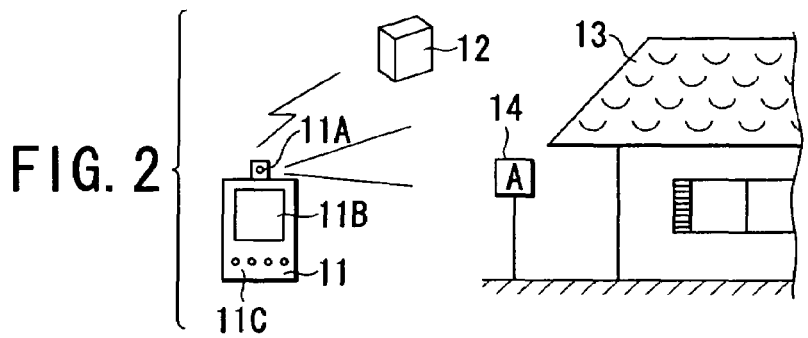
FIG. 2 is a diagram showing a constitution of a visual field agreement type information presentation system according to a first embodiment of the present invention.

As shown in FIG. 2, a visual field agreement type information presentation system according to a first embodiment of the present invention includes: a large number of portable information terminals 11 (only one is representatively shown in the drawing) for use in a specific district; and a server 12 which can communicate with these portable information terminals 11.

Here, the portable information terminal 11 is a small-sized information terminal which can be carried by a user of a PDA with a camera or a notebook-size personal computer. The portable information terminal 11 includes at least: an image pickup device 11A which is image pickup means for photographing an image; a display device 11B which is display means for displaying the image photographed by the image pickup device 11A and various types of information; and a button group 11C for inputting various types of instructions or settings. Of course, communication means for performing communication with the server 12 is also included. Additionally, the "image" includes dynamic and static photograph images, and the images are similarly handled in the following description.

Moreover, the server 12 may be disposed inside or outside the specific district. In the latter case, although not especially shown, a relay device for relaying communication between the portable information terminal 11 and server 12 is included in the specific district.

Furthermore, the specific district is dotted with facilities 13 which are photographing objects each by the image pickup device 11A of the portable information terminal 11, and a marker 14 is disposed in the vicinity of the facility. Here, in an information display surface of the marker 14, a unique pattern or symbol is shown so that the marker 14 can be distinguished from another marker. Additionally, an installation position and direction of each marker 14 are stored in a database (not shown) of the server 12. Moreover, information associated with each marker 14 is stored in the database of the server 12.

It is to be noted that as the marker 14, information indicating the position and direction disclosed in Jpn. Pat. Appln. KOKAI Publication No. 2001-118187 is displayed as a pattern indicating the information in the information display surface. In this case, the installation position and direction do not have to be stored in the database of the server 12. Moreover, the facility 13 is photographed beforehand from every direction and registered in the database of the server 12, so that the direction and facility photographed by the image pickup device 11A of the portable information terminal 11 can be distinguished by pattern matching. Then, the marker 14 can be omitted.

Moreover, although not shown, in each facility 13, a device is disposed to perform radio or cable communication with the portable information terminal 11 and/or the server 12. From the portable information terminal 11 or the server 12, reservation and reservation cancel of the facility, purchase of an article sold in the facility, or a request for distribution to a predetermined place in the specific district is possible.

Figure 3:
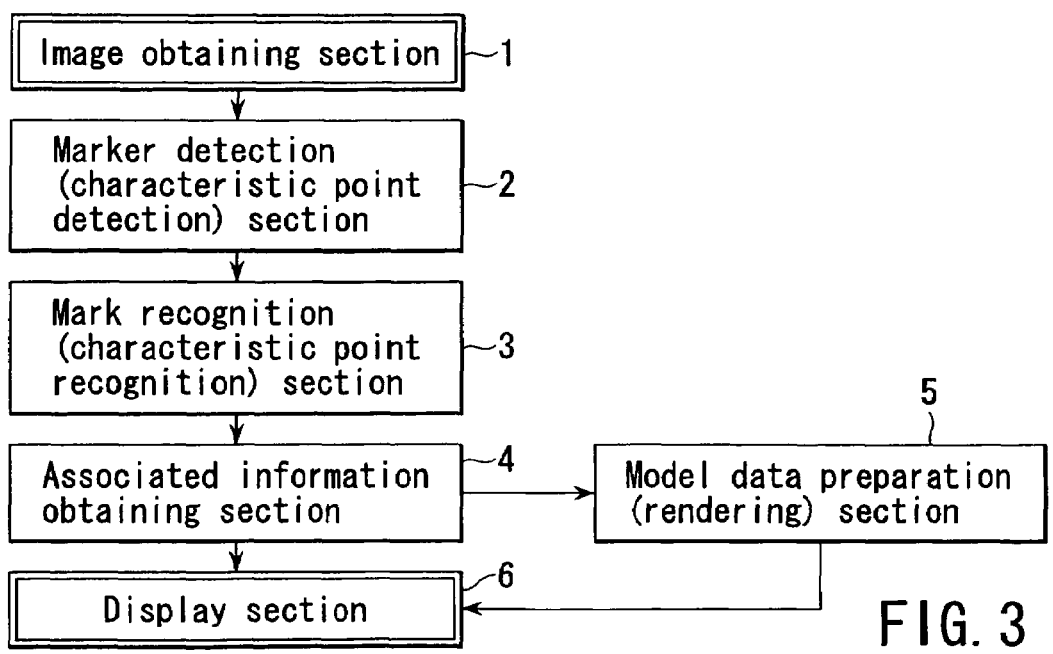
FIG. 3 is a function block diagram of the visual field agreement type information presentation system according to the first embodiment.

As shown in a function block diagram of FIG. 3, the visual field agreement type information presentation system according to the first embodiment is constituted of: an image obtaining section 1 which is image pickup means; a marker detection (characteristic point detection) section 2 which is marker detection means; a marker recognition (characteristic point recognition) section 3 which performs a function of a position/orientation relation calculation section as position/orientation relation calculation means; an associated information obtaining section 4 which is associated information obtaining means; a model data preparation (rendering) section 5 which performs a function of an image processing section as image processing means; and a display section 6 which is display means.

Here, the image obtaining section 1 corresponds to the image pickup device 11A of the portable information terminal 11. The marker detection section 2 detects the known marker 14 existing in the image obtained by the image obtaining section 1 (i.e., detects a characteristic point). The marker recognition section 3 recognizes the known marker 14 detected by the marker detection section 2 and specifies the position and direction of the marker 14. Moreover, based on the specified information, a method described above in the related art is used to calculate the position and orientation of the image obtaining section 1 (image pickup device 11A), that is, the position and direction of a user of the portable information terminal 11. The associated information obtaining section 4 obtains predetermined information associated with the marker 14 identified by the marker recognition section 3. This predetermined information is image data of the image such as an arrow indicating a movement direction. The model data preparation section 5 processes the predetermined information obtained by the associated information obtaining section 4 based on the position and orientation calculated by the marker recognition section 3. For example, based on a route to a destination set beforehand from a disposed position of the recognized marker 14, and the position and orientation, that is, the direction of the image pickup device 11A, the image prepared by the image data for indicating the movement direction. Accordingly, a guide image indicating the movement direction to the destination is prepared. The display section 6 corresponds to the display device 11B of the portable information terminal 11. The display section 6 superimposes and displays the information generated by the model data preparation section 5 on the image obtained by the image obtaining section 1.

Here, as described above, it is necessary to dispose the image obtaining section 1 and display section 6 in the portable information terminal 11. However, as in the following (1) to (8), the marker detection section 2, marker recognition section 3, associated information obtaining section 4, and model data preparation section 5 may also be disposed in either the portable information terminal 11 or the server 12.

(1) The image obtaining section 1, marker detection section 2, marker recognition section 3, model data preparation section 5, and display section 6 are disposed in the portable information terminal 11, and the associated information obtaining section 4 is disposed in the server 12. This has no problem as long as a processing capability of the portable information terminal 11 is sufficient. In this case, only the information which identifies the marker 14 may be transmitted from the portable information terminal 11 to the server 12, and an amount of transfer data is small. A large storage capacity necessary for storing associated information is not required in the portable information terminal 11. Additionally, the model data preparation section 5 requires a large processing capability for the processing, and therefore there is a possibility that a processing time of another operation performed in the portable information terminal 11 is influenced.

(2) The image obtaining section 1, marker detection section 2, marker recognition section 3, and display section 6 are disposed in the portable information terminal 11, and the associated information obtaining section 4 and model data preparation section 5 are disposed in the server 12. In this case, only the information which identifies the marker 14 may be transmitted from the portable information terminal 11 to the server 12, and the amount of transfer data is small. The large storage capacity necessary for storing the associated information is not required in the portable information terminal 11. Furthermore, since the server 12 performs the processing of the model data preparation section 5 requiring the large processing capability, there is not the problem of the above (1).

(3) The image obtaining section 1, marker detection section 2, model data preparation section 5, and display section 6 are disposed in the portable information terminal 11, and the marker recognition section 3 and associated information obtaining section 4 are disposed in the server 12. Accordingly, a detected result of the marker is transferred from the portable information terminal 11 to the server 12, and the subsequent processing is performed by the processing capability of the server 12. Also in this case, the large storage capacity necessary for storing the associated information is not required in the portable information terminal 11. Additionally, in the same manner as in (1), the model data preparation section 5 requires the large processing capability for the processing, and therefore there is a possibility that the processing time of another operation performed in the portable information terminal 11 is influenced.

(4) The image obtaining section 1, marker detection section 2, and display section 6 are disposed in the portable information terminal 11, and the marker recognition section 3, associated information obtaining section 4, and model data preparation section 5 are disposed in the server 12. In the same manner as in (2), since the large storage capacity necessary for storing the associated information is not required in the portable information terminal 11, and the server 12 performs the processing of the model data preparation section 5 requiring the large processing capability, there is no problem of (1).

(5) The image obtaining section 1, model data preparation section 5, and display section 6 are disposed in the portable information terminal 11, and the marker detection section 2, marker recognition section 3, and associated information obtaining section 4 are disposed in the server 12. The large storage capacity necessary for storing the associated information is not required in the portable information terminal 11. Additionally, since the obtained image itself is transferred to the server 12, an increase of traffic related to the transfer of the image itself becomes a problem. In the same manner as in (1), since the processing of the model data preparation section 5 requires the large processing capability, there is a possibility that the processing time of another operation performed in the portable information terminal 11 is influenced.

(6) The image obtaining section 1 and display section 6 are disposed in the portable information terminal 11, and the marker detection section 2, marker recognition section 3, associated information obtaining section 4, and model data preparation section 5 are disposed in the server 12. In this case, in the same manner as in (2), the large storage capacity necessary for storing the associated information is not required in the portable information terminal 11. Since the server 12 performs the processing of the model data preparation section 5 requiring the large processing capability, there is not the problem of the above (1). Therefore, an inexpensive portable information terminal having a low processing capability can be used. Additionally, in the same manner as in (5), the increase of traffic related to the transfer of the image itself becomes a problem.

(7) All the image obtaining section 1, marker detection section 2, marker recognition section 3, associated information obtaining section 4, model data preparation section 5, and display section 6 are disposed in the portable information terminal 11. In this case, the portable information terminal 11 is in a stand-alone state. The associated information needs to be stored in the portable information terminal 11, and it is supposed that the stored data has a limitation.

(8) The image obtaining section 1, marker detection section 2, marker recognition section 3, associated information obtaining section 4, and display section 6 are disposed in the portable information terminal 11, and the model data preparation section 5 is disposed in the server 12. Since the server 12 performs the processing of the model data preparation section 5 requiring the large processing capability, there is not the problem of the above (1).

It is to be noted that in the above (7) the server 12 is unnecessary, but it is possible to provide various types of information regardless of the marker recognized result, and it is therefore preferable to leave the server 12.

An actual application example of the visual field agreement type information presentation system according to the present embodiment will be described hereinafter.

[Theme Park]

First, the specific district which is a theme park will be described. It is to be noted that here the case (6) will be described, but any of the other constitutions (1) to (5), (7), (8) can of course be applied. In this example, as described later in detail, the associated information obtaining section 4 disposed in the server 12 also has a function of a management section which is management means for storing/managing specific district information including at least one of: installation place information of the marker 14 in the specific district; use situation and reservation situation obtained by the communication with the facility; the situation of reservation for the facility by the user of the portable information terminal; and action record of the user in the specific district.

That is, when buying an admission ticket, the user of the theme park applies to a ticket window for rental of the portable information terminal 11 prepared by the theme park, and pays an admission fee and rental fee. The payment can be settled by a credit card. Subsequently, the user receives the bought admission ticket, and enters the theme park which is the specific district via an entrance gate by the admission ticket. It is to be noted that a number unique to the ticket such as a serial number is printed (preferably further magnetically recorded) in the admission ticket. A person in charge of the ticket window operates a window terminal to register the ticket number, the rental application information of the portable information terminal, and the card number of the credit card into the server 12 at an issuance time of the admission ticket.

After entering the theme park, the user who has applied for the rental of the portable information terminal 11 goes to a rental window of the portable information terminal in the vicinity of the entrance gate, and follows a rental procedure. That is, the user transfers the admission ticket to a person in charge. The person in charge who has received the admission ticket operates the rental window terminal to transmit the printed (magnetically recorded) ticket number to the server 12, and can confirm whether the user is registered in a rental list of the portable information terminal. After the confirmation is completed, ID exclusive for the portable information terminal is issued, and this ID is added/registered into the record of the server 12. Moreover, this ID is also printed on the admission ticket. Subsequently, the printed admission ticket is transferred to the user of the portable information terminal together with the portable information terminal 11 for rent.

It is to be noted that a way to use the portable information terminal 11 is preferably briefly lectured in transferring the terminal to the user. Of course, when the way to use is unclear, the user can call a HELP screen of the portable information terminal 11 to instantly know the way to use, or can ask a staff member in the theme park.

Moreover, the ID newly printed in the admission ticket returned here does not have to be often referred to in the theme park. However, when the user comes home, logs in a Web page operated by the theme park, and refers to snapshots or action route record, the ID is necessary. The ID has a time limitation, and cannot be used with an elapse of a given period. When the ID is continued to be used, a procedure for extension is performed on the Web page. The same ID can continuously be used for the given period or for an extended usable period. In again buying the admission ticket, the user shows the admission ticket in which the continuously usable ID is described, or applies for the continued ID. In this case, the person in charge of the ticket window can confirm user data of the credit card used in buying the admission ticket on the day to judge whether the ID is really continuously used or newly used. Additionally, when the credit card for use is changed from the previously or continuously used card, the ID needs to be declared. In this case, it is necessary to again register association among the user and the ID of the portable terminal use and the credit card number, but an admission ticket sell operation is prevented from becoming largely intricate.

Then, the user carries the rented portable information terminal 11 and moves forward in the theme park. Here, the user calls a preparation function of schedule from menu of the portable information terminal, and can prepare the tour schedule of events and attractions on the day.

Figure 4:
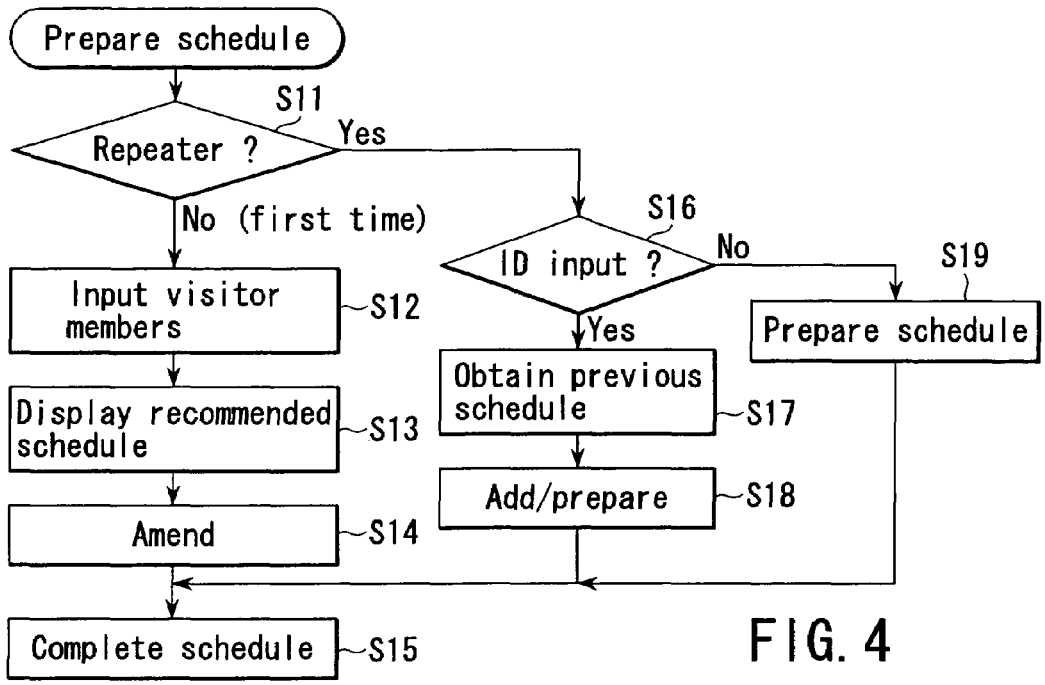
FIG. 4 is a flowchart showing a schedule preparation operation.

That is, as shown in FIG. 4, first a guidance is displayed in the display device 11B to designate whether or not the user is a repeater, and accordingly the user operates the button group 11C to check the designated result (step S11). Here, when the user is not a repeater, that is, when the user plays at the theme park for the first time, the user is further allowed to input members of visitors including the user in response to the guidance display (step S12). Then, the portable information terminal 11 displays recommended schedule prepared by the corporation of the theme park, which is stored beforehand or obtained by the communication with the server 12, in the display device 11B (step S13). For the recommended schedule, the schedule for each of groups such as family, lovers, and children, that is, a plan of participation in recommended attractions or events for each user group is prepared, and selected and provided in accordance with the inputted visitor members. Subsequently, the schedule is amended so as to suit user's taste by the user (step S14), and is completed (step S15). In this manner, the display device 11B and button group 11C of the portable information terminal 11 perform a function of a destination setting section which is destination setting means or a schedule setting section which is schedule setting means. It is to be noted that the schedule completed in this manner is registered in the server 12 in accordance with the ID. That is, the associated information obtaining section 4 of the server 12 includes a function of a schedule storage section which is schedule storage means. During the amending of the schedule, a waiting time of the attraction or event at the present time is displayed, and a change is possible such that attractions or events having a long waiting time are toured later and available attractions or events are first participated in.

Moreover, when the user is the repeater (step S11), the terminal further accepts the input of ID. When there is an ID input having the time limitation (step S16), the previous schedule and action record stored in the server 12 is obtained and displayed by the ID (step S17). The user adds/prepares the schedule based on the display (step S18), associates the completed schedule with the ID, and registers the schedule in the server 12 (step S15). In this case, it is possible to continuously support the action. For example, the attractions or events missed at the previous visit of the park are toured this time.

On the other hand, when the user is the repeater (step S11), but when there is not any input of ID (step S16), the schedule is arbitrarily prepared (step S19), associated with the ID of the portable information terminal, and registered in the server 12. It is to be noted that it is preferable for the repeater not only to set the schedule on user's own way but also to present additional information such as limited attractions or events which are held only in this time.

Moreover, it is more preferable to make a restaurant reservation at a schedule preparation time. That is, the schedule can be prepared for the whole day including a time in a specific restaurant between the attractions or events. Of course, a reservation situation or congestion situation of the restaurant is managed by the server 12 in a concentrated manner and can be presented to the portable information terminal 11 as needed. The reservation can be made while checking vacant seats or avoiding a busy time zone. Of course, cancellation is possible at any time. When the user participates in the attraction or the event and cannot be in time for a scheduled time, the reservation may be canceled on the portable information terminal. In this manner, a function of a facility management section which is facility management means can be imparted to the associated information obtaining section 4 of the server 12. The image pickup device 11A and button group 11C of the portable information terminal 11 can perform a function of a reservation section which is reservation means.

The user who has prepared a series of schedules in this manner participates in the attraction or the event as scheduled. According to the schedule, the next site is possibly sometimes far. The repeater probably grasps all the sites where the respective attractions or events are held, but a first visitor has to look at the map distributed at the entrance and to confirm the positions one by one before moving. However, in recent years, a sufficiently broad space has been prepared for the theme park. The visitor needs to walk a considerably long distance while moving end to end.

The markers 14 are installed in many places in the theme park which is the specific district. As described above, when the marker 14 is photographed by the image pickup device 11A of the portable information terminal 11, the server 12 can grasp the current position of the user of the portable information terminal. Therefore, the server 12 judges an optimum route to the next destination position from the current position based on the prepared schedule or by the input of the next destination by the user, and displays guidance in the display device 11B of the portable information terminal 11. The associated information obtaining section 4 of the server 12 has functions of a density check section which is density check means for checking the congestion situation of each attraction or event from the current position of the portable information terminal 11, and a waiting time storage section which is waiting time storage means for storing the waiting time. Therefore, congestion information or waiting time information is displayed in the portable information terminal 11 in the place or in all the terminals, and thereby the function of a leading section can be performed, which is-leading means for leading the user to another attraction or event. At this time, the associated information obtaining section may also include the function of a schedule preparation section which is schedule preparation means for generating the schedule for efficiently routing the respective attractions or events to display the schedule in each portable information terminal 11. Furthermore, the function of a schedule management section which is schedule management means for obtaining a difference from the set schedule from the current time and current position to display the information based on the difference in the portable information terminal 11 may be imparted to the associated information obtaining section 4 of the server 12.

Figure 5:
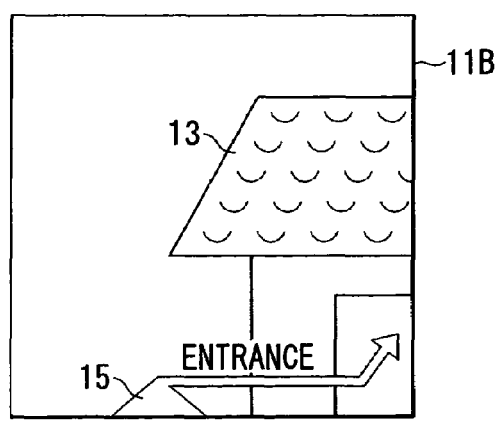
FIG. 5 is a diagram showing an image of superimposed information displayed in a display device.
Figure 6:
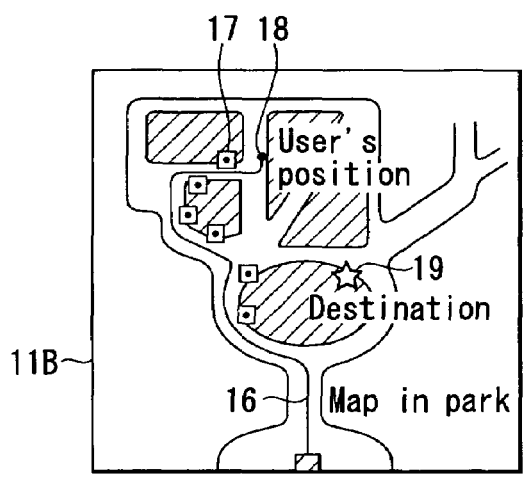
FIG. 6 is a diagram showing a two-dimensional navigation display example.

The guidance is three-dimensionally displayed on the actually photographed image as described above. For example, as shown in FIG. 5, an indication of an arrow 15 along a road is shown in the screen of the display device 11B of the portable information terminal 11. A usual map is two-dimensionally displayed. With a bird's eye view of the whole theme park, the current position is generally connected to the destination by a line and shown. However, in the display of the present system, with the user's movement, the direction of the indication by the arrow 15 also changes. For example, when the user shakes head, the viewed road is simultaneously moved in the visual field by the shaking. Similarly in the display of the present system, the direction of the indication is changed by the shaking, and a direction in which the user has to move is necessarily pointed. The present system has a so-called navigation function of detecting a visual line of the portable information terminal 11, and accurately tracking the change of the orientation of the portable information terminal 11 to display appropriate information. Of course, as shown in FIG. 6, in the same manner as in the prior-art map, it is also possible to two-dimensionally display the information. In FIG. 6, reference numeral 16 denotes a walk track display, 17 denotes the photographed marker, 18 denotes the current position, and 19 denotes the destination.

Moreover, similarly, it is also possible to photograph the marker 14 and to obtain guide information in the facility. That is, the marker 14 is photographed, and a guide menu of a building is selected. Then, a three-dimensional superimposed model of the building whose marker 14 has been photographed can be displayed from the current position. For the model, a so-called plain display is also possible. It is possible to graphically obtain the information indicating the state inside the building such as the position of a reception desk, and the position of a toilet. Of course, the above-described navigation function is also effective in the building. Even after the user enters the building, and when the destination is a specific room, an accurate instruction continues to be issued during the movement, and the user is led to the room.

This marker recognition is left as the record of the user's movement in background. That is, the data is associated with the ID and stored as the record information of the day in the server 12 for a given period before the user goes out of the theme park. Even after the user comes home, the user can browse the information as the track of the user of the ID in the theme park on the day on the above-described Web page. In this manner, the associated information obtaining section 4 of the server 12 has the function of a track route calculation section which is track route calculation means.

Moreover, as described above, the portable information terminal 11 includes the image pickup device 11A which is a camera, and it is therefore possible to take snapshots. The position information and photographing time of the recently photographed marker 14 are attached, and the photographed snapshots are stored in the server 12. Therefore, a photographer does not have to memorize details of a photographed place. After coming home, the photographer can recognize information such as snap data attached to an image diagram of the whole facility, a shooting place, a photographed object, and a shooting time at a glance in the Web page. In this manner, the associated information obtaining section 4 of the server 12 includes the function of an image storage section which is image storage means, and the function of a download section which is downloading means.

Furthermore, a shop (stall) for selling high-value-added articles which can be bought only in the theme park. For the purchase of the article, the information presented in the portable information terminal 11 can be used to buy the article in a remote area without actually visiting the shop.

Figure 7:
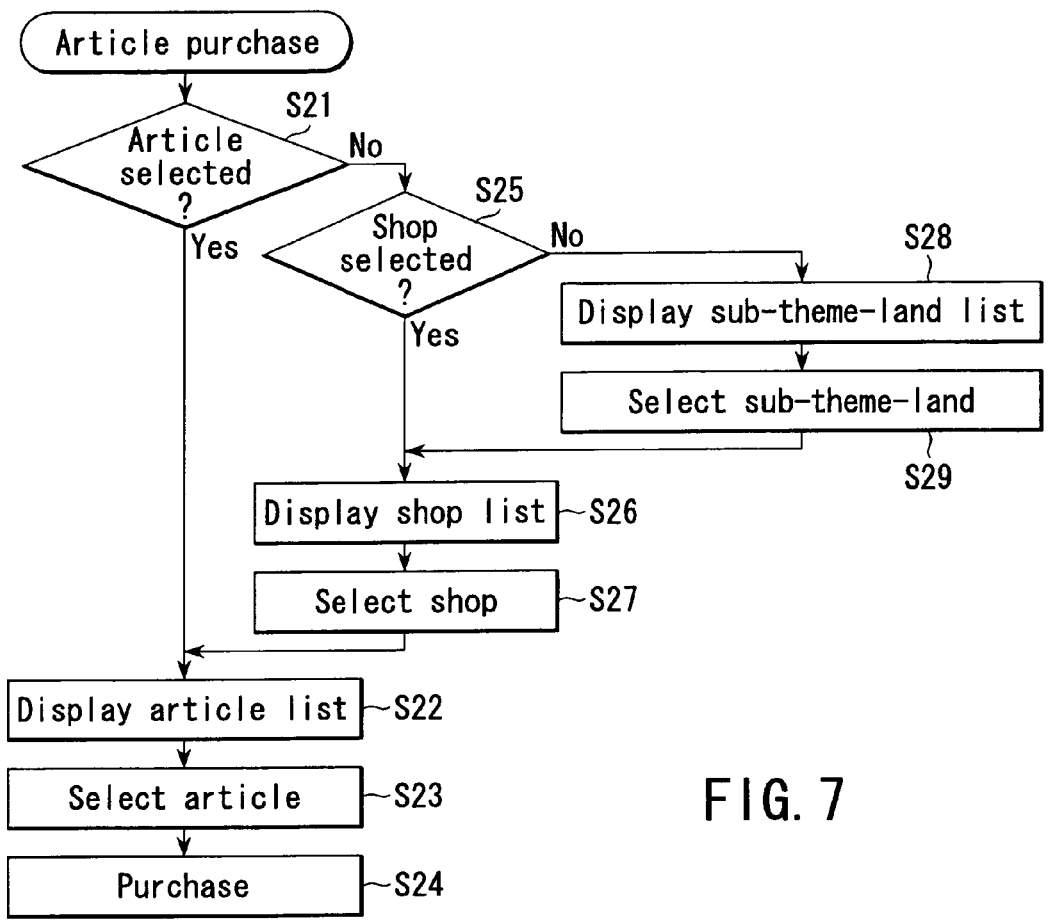
FIG. 7 is a flowchart showing an article purchase operation.

In this case, as shown in FIG. 7, on the portable information terminal, it is possible to select a method of searching the articles, a method of searching shops, and a method of searching shops only of a sub-theme-land in the theme park. The purchase methods are prepared in accordance with users' levels.

That is, when the article is searched (step S21), a list of all the articles dealt in by the shops in the theme park (including at least the image and price information) is transmitted to the portable information terminal 11 from the server 12, and displayed (step S22). Moreover, the user of the portable information terminal 11 selects a desired article from the list (step S23), and requests the server 12 for a purchase procedure (step S24).

Furthermore, when the shop is searched (step S25), the list of the shops in the theme park is transmitted and displayed into the portable information terminal 11 from the server 12 (step S26). Subsequently, the user of the portable information terminal 11 selects the desired shop from this list (step S27). When the desired shop is selected in this manner, a list of articles dealt in by the selected shop (including at least the image and price information) is transmitted to the portable information terminal 11 from the server 12 and displayed (step S22). On receiving article selection by the user (step S23), the portable information terminal 11 requests the server 12 for the purchase procedure of the article (step S24).

Alternatively, when the shop in the sub-theme-land is searched (step S25), a list of sub-theme-lands is transmitted to the portable information terminal 11 from the server 12, and displayed (step S28). Moreover, the user of the portable information terminal 11 selects a desired sub-theme-land from the list (step S29). In response to the selection of the sub-theme-land, a list of shops in the sub-theme-land is displayed (step S26). When the desired shop is selected (step S27), further a list of articles dealt in by the selected shop (including at least the image and price information) is displayed (step S22). On receiving the article selection by the user (step S23), the portable information terminal 11 requests the server 12 for the purchase procedure of the article (step S24).

In this manner, the associated information obtaining section 4 of the server 12 includes the function of an article management section which is article management means, and the image pickup device 11A and button group 11C of the portable information terminal 11 perform the function of a purchase section which is purchase means.

It is to be noted that the purchase procedure may be purchase reservation of the article, or a delivery request into a predetermined place of the theme land such as a pick-up window near an exit gate. The server 12 instructs a person in charge for arrangement by the terminal in the shop which deals in the article or in the pick-up window. In this case, for the payment for the purchased article, the credit card is used as ID authentication at a rental time of the portable information terminal 11, the card number is stored in the associated information obtaining section 4 which performs the function of a card number storage section as card number storage means, and the payment is more preferably settled by the credit card. With this credit card settlement, it is not necessary to line up at a cash register at an article pick-up time. When the articles are collectively received at the pick-up window near the exit gate on one's way home, a trouble of carrying heavy baggage while moving in the theme park is eliminated.

[Museum]

Next, the specific district which is a museum will be described. Additionally, in highly public facilities such as the museum, business by the rental of the portable information terminal 11 is not assumed. However, when the rental is performed, user's social standing needs to be guaranteed for the rental in some form. Therefore, here, in the same manner as in the theme park, the credit card is used to rent the portable information terminal, of course, a method of filling in a rental sheet, and presenting identification to perform the rental operation is also considered. Instead of freely carrying the portable information terminal, a mode for using the terminal only in a certain room, or an installation mode of the terminal is also considered. With the use in the individual room, the terminal is used in the form of renting the terminal in an entrance at an entrance time in an exhibition room and returning the terminal at an exit time.

For example, the user rents the portable information terminal 11 in the entrance of the exhibition room and proceeds in the facility. The user proceeds to an exhibit in the museum, and the marker 14 is attached beside an explanatory panel of the exhibit, or beside the exhibit. When the marker 14 is photographed by the image pickup device 11A of the portable information terminal 11 or a terminal installed in front of the exhibit, the information associated with the marker 14 appears on the screen of the display device 11B.

For example, for a skeleton specimen of a dinosaur, a three-dimensional image of the dinosaur to which skin is attached is displayed in the screen. For the display, in synchronization of the visual line of the image pickup device 11A of the portable information terminal 11, a drawn position is accurately changed (processed). Therefore, even when the user observes the specimen walking around the specimen, the image is drawn accurately in synchronization with the user's movement. That is, when the user views the skeleton specimen moving toward a tail from a head side of the specimen, the data of the image responds to the movement, and the drawn data changes toward the tail from the head. Accordingly, although the specimen only of the simple skeleton is viewed, a sense can be obtained as if a stuffed specimen of the dinosaur including the skeleton coated with the skin were exhibited before the user in an actual scale.

Figure 8A:
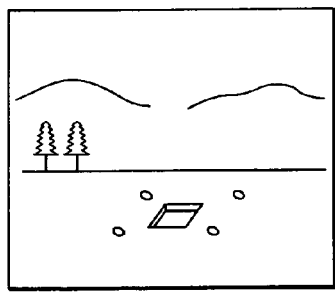
FIG. 8A is a diagram showing an actual display state of an ancient monument.
Figure 8B:
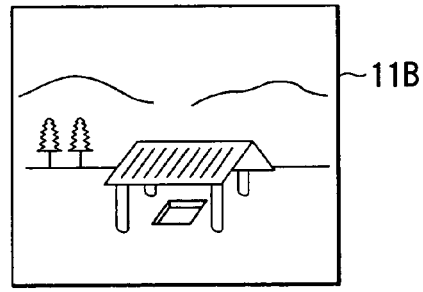
FIG. 8B is a diagram showing a superimposed display state of a restored model of the ancient monument.

Next, an example of an exhibit showing an ancient human life will be described. For remains of habitation sites, land including only holes of remains of columns of a house is dug, and the dug remains are sometimes exhibited as house remains without being changed (see FIG. 8A). Alternatively, restored houses are sometimes built in the site. With the use of the present system, without actually preparing restored objects, as shown in FIG. 8B, it is possible to view the exhibit as if the house were constructed in the position. That is, the system comprises: preparing a three-dimensional model in which the remains of the holes form a foundation of the columns as a restored image; and drawing/displaying the image on the screen of the display device 11B of the portable information terminal 11. The marker 14 is disposed in the house remains. When the marker 14 is observed, the three-dimensional model is drawn. In the same manner as in the example of the skeleton specimen, the image is synchronized with a visual point. Therefore, the drawn image changes in accordance with the direction in which the user views the image. The user feels as if a real thing existed before the user. Here, when the user casts eyes to actual scenery, real space spreads including only the remains of the houses. A merit is also considered that it is possible to accurately obtain the sense of scales of actual houses or village by the contrast.

With the use of the present system, it is possible to sophisticate usual explanations of the exhibit such as written sentences and video explanation and to increase additional values. For example, it is assumed that there is an explanation panel indicating a habitat territory of a stuffed animal before the stuffed animal. In general, there would be an explanation long enough to be easily read together with a distribution map. Additionally, the marker 14 is described in the explanation panel. When the marker 14 is captured in the visual field by the image pickup device 11A of the portable information terminal 11, more detailed information is displayed in the screen of the display device 11B of the portable information terminal 11. For example, video may also be drawn/displayed in the portable information terminal 11 indicating hierarchisation, living territory, staple food, speed of growth, character, method of breeding, species to which the animal belongs, evolution through which the animal has passed, and actual living.

[Shopping Mall]

Next, the specific district which is a shopping mall will be described. In this case, when renting the portable information terminal 11 as in the theme park, a method of presenting the credit card by the user for the rental is supposed to be most appropriate. Additionally, since the purchase in the shopping mall is a main purpose for the user, it is not efficient to incur expenses for renting the terminal. It is important to bear the expenses on a corporation side of the shopping mall and to eliminate financial burden on a user side. When the user presents the credit card, the reduction of the financial burden is not the main purpose, and the card is used to mean the identification.

For the information to be presented to the user in the portable information terminal 11, in the same manner as in the theme park, examples of the information include: first the map information of the shopping mall, that is, layout information of the shops; and then navigation information to the objective shop. Furthermore, individual information of each shop such as clearance sale information is also included.

Figure 9:
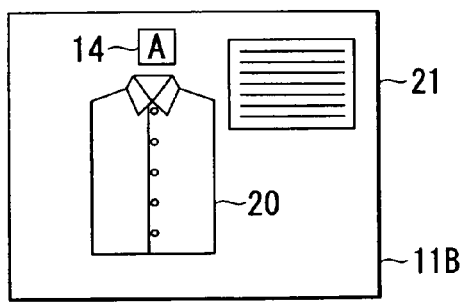
FIG. 9 is a diagram showing that detailed information of an article is displayed.

Concretely, the user stands in the entrance of the shopping mall, photographs the marker 14 installed in the place with the image pickup device 11A of the portable information terminal 11, and selects, for example, the map information or the guide to the objective shop from alternatives displayed in the screen of the display device 11B, so that the selected content is displayed. Following the navigation, the user moves in the mall and enters the shop. There is the marker 14 in the entrance of the shop. When the marker 14 is photographed by the image pickup device 11A, the guidance unique to the shop is displayed. The guidance is a guidance of the clearance sale information of the shop, or the position of display of the dealt-in articles. The user can grasp the display position of the objective article relying on the screen display without asking a shop clerk any question, and is can obtain the clearance sale information without obtaining the information beforehand by a folded leaf advertisement of a newspaper. Furthermore, as shown in FIG. 9, the individual marker 14 is disposed for an article on display 29, and the individual information may also be registered as incidental information in the marker 14. In this case, when the marker 14 is photographed by the image pickup device 11A of the portable information terminal 11 to obtain the detailed guidance, it is not necessary to separately obtain any catalog, and detailed information 21 of the article can be obtained/displayed. In this manner, convenience for the user is much enhanced, because it is possible to obtain the desired article or to know the content of the desired article without any advance knowledge beforehand or without any explanation of a sales assistant. A merit in management is large for the corporation because it is unnecessary to employ the sales assistants more than necessary.

SECOND EMBODIMENT

Figure 10:
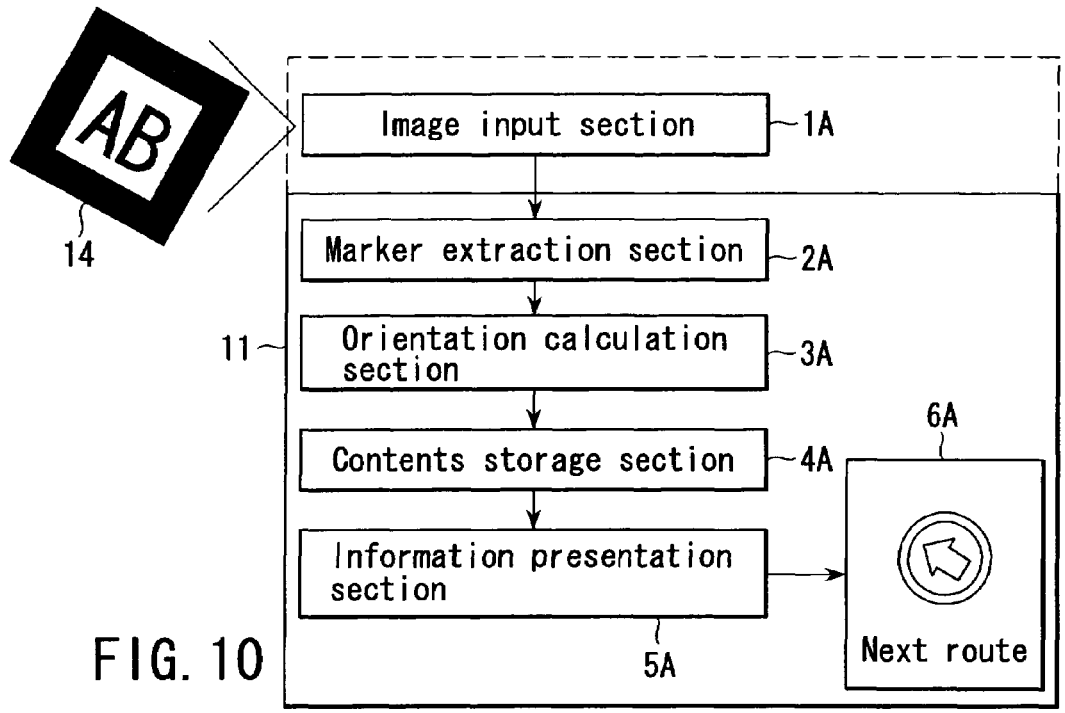
FIG. 10 is a diagram showing the constitution of the visual field agreement type information presentation system according to a second embodiment of the present invention.

As shown in FIG. 10, the visual field agreement type information presentation system according to a second embodiment of the present invention includes the specific marker 14, the portable information terminal 11, and an image input section 1A which is image input means. The portable information terminal 11 includes: a marker extraction section 2A corresponding to marker extraction means; an orientation calculation section 3A corresponding to orientation calculation means; a contents storage section 4A corresponding to contents storage means; an information presentation section 5A corresponding to information presentation means; and a display section 6A corresponding to display means.

Here, the image input section 1A is a camera attachable/detachable with respect to the portable information terminal 11. The section can be attached to the portable information terminal 11 to transmit real-time image data to the portable information terminal 11. Of course, as shown by a broken line in FIG. 10, in the same manner as in the first embodiment, the image input section 1A may integrally be disposed in the portable information terminal 11, such as a PDA including the camera and a cellular phone including the camera.

The user captures the specific marker 14 including a unique pattern or symbol in an information display surface by the image input section 1A so that the marker can be distinguished from another marker. Accordingly, the image data is transferred to the marker extraction section 2A disposed in the portable information terminal 11, and a specific marker 14 portion in the image data is extracted. A geometric attribute of the specific marker 14 is registered beforehand in the orientation calculation section 3A. The orientation calculation section 3A compares the appearance of the marker 14 obtained as the image data with the geometric attribute to calculate the spatial orientation of the image input section 1A by which the image data has been obtained. Moreover, for example, as a result, it is assumed that the image input section 1A has rotated by $(\theta_x, \theta_y, \theta_z)$ with respect to an axis of the marker 14. Here, it is assumed that predetermined information stored beforehand in the contents storage section 4A and associated with the marker 14 is the arrow. In this case, the information presentation section 5A imparts an offset of $(\theta_x, \theta_y, \theta_z)$ to the orientation at a registration time of the arrow, and displays presented data in the screen of the display section 6A.

An operation image of the present embodiment will be described hereinafter. Signboards including the markers 14 are installed in spots in a sightseeing area. The user photographs the marker 14 with the image input section 1A attached to or built in the portable information terminal 11 the user has. As a result, the name and direction of the next recommended sightseeing spot, which are the predetermined information associated with the marker 14, are displayed in the screen of the display section 6A of the portable information terminal 11, and the user continues the sightseeing following the display. When the marker 14 is photographed, the user does not have to necessarily capture the marker 14 from the front surface. When the arrow is registered in accordance with a spatial coordinate with the marker 14 arranged therein, the marker is necessarily displayed in the portable information terminal 11 without collapsing the spatial position relation between the marker 14 and the arrow.

THIRD EMBODIMENT

Figure 11:
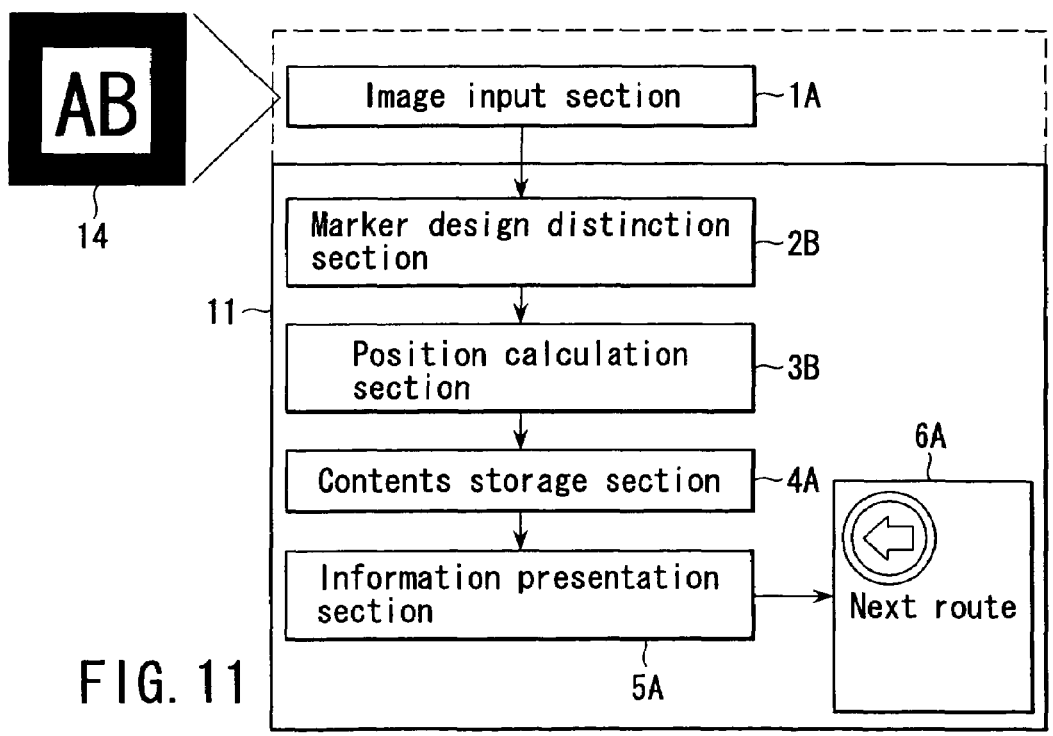
FIG. 11 is a diagram showing the constitution of the visual field agreement type information presentation system according to a third embodiment of the present invention.

As shown in FIG. 11, in the visual field agreement type information presentation system according to a third embodiment of the present invention, the portable information terminal 11 includes a marker design distinction section 2B which is marker design identification means, and a position calculation section 3B which is position calculation means, instead of the marker extraction section 2A and orientation calculation section 3A in the second embodiment.

In the present embodiment, the image data is transferred to the marker design distinction section 2B from the image input section 1A, and the design of the specific marker 14 portion in the image data is distinguished. The design attribute of the specific marker 14 is registered beforehand in the marker design distinction section 2B. The marker design distinction section 2B searches the marker which matches with the presently obtained marker from the appearance of the marker 14 obtained as the image data. Subsequently, the position calculation section 3B knows the change of the design of the obtained marker with respect to the registered marker design to calculate the spatial position where the image input section 1A has obtained the present data. As a result, for example, it is assumed that translation of the image input section 1A by $(\delta_x, \delta_y, \delta_z)$ with respect to the axis of the marker 14 has been calculated. It is further assumed that the predetermined information registered beforehand in the contents storage section 4A and associated with the marker 14 is the arrow. In this case, the information presentation section 5A imparts the offset of $(\delta_x, \delta_y, \delta_z)$ to the orientation of the arrow at the registration time, and displays the presented data in the screen of the display section 6A.

The operation image of the third embodiment will be described hereinafter. The signboard in which the marker 14 is disposed is installed in an observatory of the sightseeing area. The user photographs the marker 14 with the image input section 1A attached to or built in the portable information terminal 11 the user has. As a result, in the screen of the display section 6A of the portable information terminal 11, a name of a mountain in a faraway scenery and an arrow indicating the position of a peak of the mountain, which are the predetermined information associated with the marker 14, are displayed, and the user can enjoy the scenery viewed from the observatory. When the marker 14 is photographed, the user does not have to necessarily capture the marker from the front surface. When the arrow is registered in accordance with the spatial coordinate with the marker 14 arranged therein, the marker is necessarily displayed in the portable information terminal 11 without collapsing the spatial position relation between the marker 14 and the arrow.

FOURTH EMBODIMENT

Figure 12:
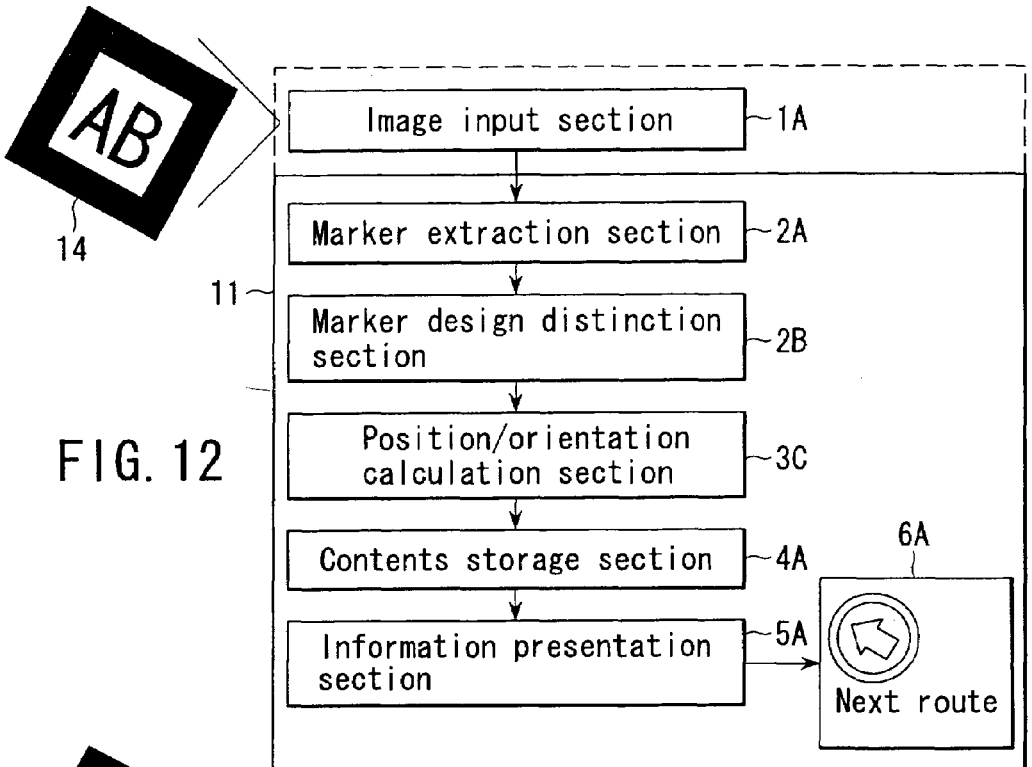
FIG. 12 is a diagram showing the constitution of the visual field agreement type information presentation system according to a fourth embodiment of the present invention.

As shown in FIG. 12, in the visual field agreement type information presentation system according to a fourth embodiment of the present invention, the portable information terminal 11 includes: the marker extraction section 2A in the second embodiment; the marker design distinction section 2B in the third embodiment; and a position/orientation calculation section 3C which is position/orientation calculation means including both the functions of the orientation calculation section 3A in the second embodiment and the position calculation section 3B in the third embodiment.

That is, in the present embodiment, the image data from the image input section 1A is transferred to the marker extraction section 2A disposed in the portable information terminal 11, and the specific marker portion in the image data is extracted. Subsequently, the data of the extracted marker portion is transferred to the marker design distinction section 2B, and the design of the specific marker portion in the data of the marker portion is distinguished. The geometric attribute and design attribute of the specific marker 14 are registered beforehand in the position/orientation calculation section 3C. The position/orientation calculation section 3C compares the appearance of the marker obtained as the image data with these attribute data to calculate the spatial position/orientation by which the image input section 1A has obtained the image data. Moreover, as a result, for example, it is assumed that $(\theta_x, \theta_y, \theta_z)$ rotation and $(\delta_x, \delta_y, \delta_z)$ translation of the image input section 1A with respect to the axis of the marker 14 have been calculated. It is further assumed that the predetermined information registered beforehand in the contents storage section 4A and associated with the marker 14 is the arrow. In this case, the information presentation section 5A imparts the offset of the $(\theta_x, \theta_y, \theta_z)$ rotation and the $(\delta_x, \delta_y, \delta_z)$ translation to the orientation at the registration time of the arrow, and displays the presented data in the screen of the display section 6A.

The operation image of the present embodiment will be described hereinafter. The signboard in which the marker 14 is disposed is installed in the dug remains of Jomon remains (park). The user photographs the marker 14 with the image input section 1A attached to or built in the portable information terminal 11 the user has. As a result, in the screen of the display section 6A of the portable information terminal 11, CG image of a restored building structure, which is the predetermined information associated with the marker 14, is displayed on a base of a dug and appearing ancient architecture. When the marker 14 is photographed, the user does not have to necessarily capture the marker 14 from the front surface. The restored building can be viewed from each direction as if the user turned around the base, that is, the user walked viewing around the building and viewed the marker 14 from each direction. Even in this case, the marker is necessarily displayed in the portable information terminal 11 without collapsing the spatial position relation between the marker 14 and the restored building.

FIFTH EMBODIMENT

Figure 13:
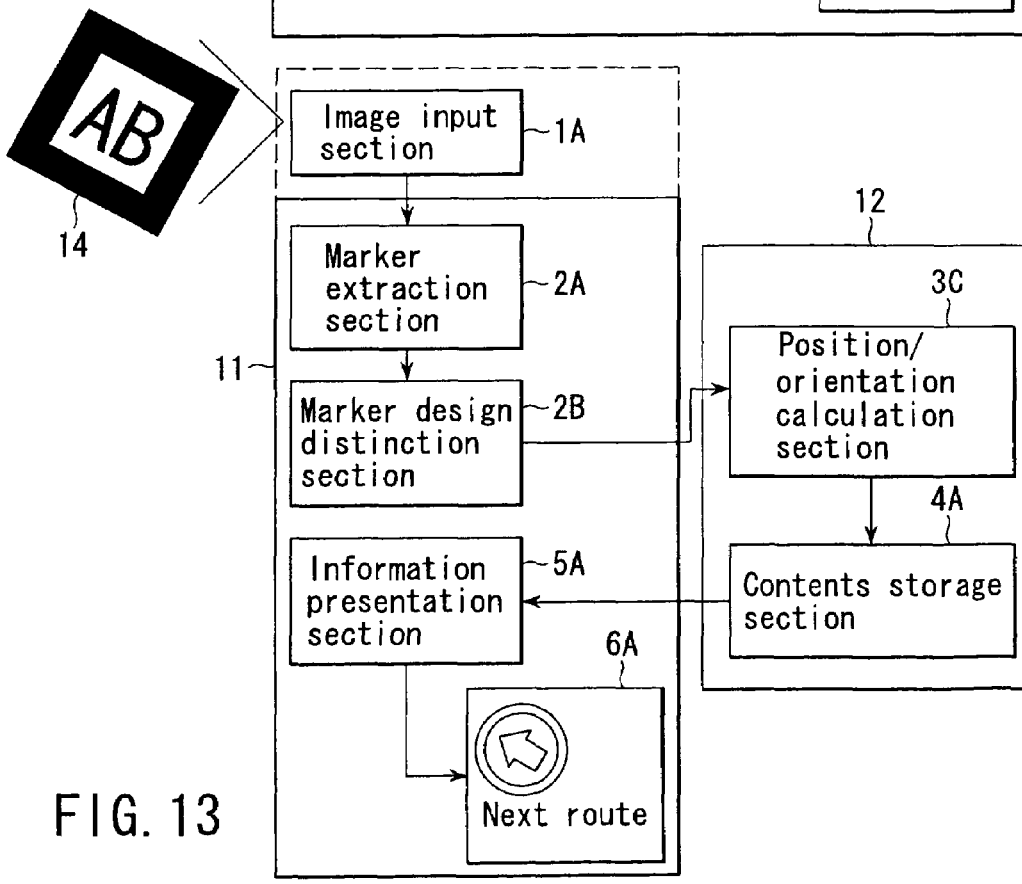
FIG. 13 is a diagram showing the constitution of the visual field agreement type information presentation system according to a fifth embodiment of the present invention.

As shown in FIG. 13, in the visual field agreement type information presentation system according to a fifth embodiment of the present invention, the marker extraction section 2A, marker design distinction section 2B, information presentation section 5A, and display section 6A in the fourth embodiment are disposed in the portable information terminal 11. The position/orientation calculation section 3C and contents storage section 4A in the fourth embodiment are disposed in the server 12 which can communicate with the portable information terminal 11.

That is, in the fourth embodiment, the respective function sections including the (image input section 1A), marker extraction section 2A, marker design distinction section 2B, position/orientation calculation section 3C, information presentation section 5A, and contents storage section 4A are disposed in the portable information terminal 11, and the operation of the single unit of the portable information terminal 11 is performed. However, as described above in the first embodiment, the group of the functions other than the image input section 1A attached to or mounted on the portable information terminal 11 to operate is not mounted in the portable information terminal 11, and is mounted in the server 12 with which the portable information terminal 11 can communicate. The processes of the respective functions are performed in the server 12. Only the results are transmitted to the portable information terminal 11. In this case, the display section 6A can also present the information.

In this case, the respective function sections such as the marker extraction section 2A, marker design distinction section 2B, position/orientation calculation section 3C, and information presentation section 5A operate independently of one another. A final result is not influenced by whether any of the functions is disposed in the portable information terminal 11 or in the external server 12. Therefore, it is possible to determine the constitution in consideration of the capability of the portable information terminal 11 for use or the size or actual operation situation of the distributed information. That is, the distribution shown in FIG. 12 is only one example, and the present invention is not limited to this. The present invention is not limited to one server, and the means may also be distributed to a plurality of servers.

For the image of the operation of the present embodiment, the operation example of the fourth embodiment will be extended and described hereinafter.

The signboard in which the marker 14 is disposed is installed in the dug remains of Jomon remains (park). The user photographs the marker 14 with the image input section 1A attached to or built in the portable information terminal 11 the user has. The marker extraction section 2A disposed in the portable information terminal 11 extracts the marker portion from the image data at this time. Next, the result is similarly transferred to the marker design distinction section 2B disposed in the portable information terminal 11. Subsequently, the detected data of the marker obtained as the result of calculation is transferred to the external server 12.

The external server 12 transfers the detected data of the transferred marker to the position/orientation calculation section 3C, and this section calculates a coordinate value of the image input section 1A in a spatial coordinate system in which the marker 14 is disposed. Additionally, the presented data which is the predetermined information registered in the contents storage section 4A by the marker design and associated with the marker 14 is searched, and the final presented information is prepared. Subsequently, the presented information is distributed to the information presentation section 5A of the portable information terminal 11.

As a result, in the screen of the display section 6A of the portable information terminal 11, the CG image of the restored building, which is the predetermined information associated with the marker 14, is displayed on the base of the dug and appearing ancient architecture. When the marker 14 is photographed, the user does not have to necessarily capture the marker 14 from the front surface. The restored building can be viewed from each direction as if the user turned around the base, that is, the user walked viewing around the building and viewed the marker 14 from each direction. Even in this case, the marker is displayed in the portable information terminal 11 without collapsing the spatial position relation between the marker 14 and the restored building.

For an effect in the fifth embodiment, the portable information terminal generally having a low processing capability does not have to perform all the processes. The processes are scattered, the system is efficiently operated, and real-time properties of the processing and system operation can be secured.

It is to be noted that the communication and distribution of the data are not especially limited as long as the data can be transferred in environments such as cable LAN, radio LAN, PHS circuit, cellular phone circuit, infrared ray communication, and Bluetooth.

The present invention has been described above based on the embodiments, but the present invention is not limited to the embodiments, and of course the present invention can variously be modified or applied within the scope of the present invention.

For example, the present invention can also be applied to a cellular phone and car navigation ubiquitous computing. Furthermore, needless to say, the present invention is not limited to a sightseeing purpose described in the embodiment, and can also be applied to a construction/manufacturing industry.

Moreover, the specific district is not limited to the theme park, museum, and shopping mall described in the embodiment, and may include larger units such as a town, state, and country.

In recent years, a system in the cellular phone including the camera has spread which comprises: recognizing the marker (e.g., a specific signboard or a logo on the building) set in the city from the camera; and superimposing/displaying the associated information in the camera screen. In this system, as the applied example of the present invention, for the recognition process and position/orientation calculation process of the marker, it is possible to set a process distribution (on a terminal side and on a server side) different with each type of the cellular phone or to appropriately distribute the respective function processes in accordance with a carrier.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An information presentation system, comprising:
a plurality of known markers distributed in a specific district which is an object of the system;
an image pickup device configured to photograph an image;
a display device configured to display the image photographed by the image pickup device;
a marker detection section configured to detect the known markers existing in the image photographed by the image pickup device;
a position/orientation relation calculation section configured to indentify the known marker detected by the marker detection section to calculate position and orientation relations between the identified known marker and the image pickup device;
an associated information obtaining section configured to obtain predetermined information associated with the known marker identified by the position/orientation relation calculation section; and
an information processing section configured to process the predetermined information obtained by the associated information obtaining section based on the position and orientation relations calculated by the position/orientation relation calculation section,
wherein the display device superimposes and displays the information processed by the information processing section on the image photographed by the image pickup device,
wherein at least the image pickup device and display device are disposed in a portable information terminal, and the other sections are disposed in a server which performs radio communication with the portable information terminal,
wherein the server is constituted such that the server handles a plurality of portable information terminals, and the associated information obtaining section functions as a density confirmation section with respect to each portable information terminal, which stores the order of a plurality of identified known markers and which calculates and stores a user's action route of the portable terminal from the stored order of the markers and an arranged position relation of the markers in the specific district and which confirms a density of all the users of the plurality of portable terminals in each division in the specific district at each time,
wherein the associated information obtaining section includes a leading section configured to transmit information for arbitrarily promoting leading to a specific facility or division in the specific district to a user's portable information terminal positioned in a division having high density or an arbitrary portable information terminal, based on the confirmed density at a current time or in response to a manager's request of the server, and
the portable information terminal displays the information in the display device, when the information promoting the leading is received.

2. The information presentation system according to claim 1, wherein the portable information terminal includes the image pickup device, marker detection section, and display device, and
the server includes the position/orientation relation calculation section, associated information obtaining section, and information processing section.

3. The information presentation system according to claim 1, wherein the portable information terminal includes the image pickup device, information processing section, and display device, and
the server includes the marker detection section, position/orientation relation calculation section, and associated information obtaining section.

4. The information presentation system according to claim 1, wherein the portable information terminal includes the image pickup device, marker detection section, position/orientation relation calculation section, and display device, and
the server includes the associated information obtaining section and information processing section.

5. The information presentation system according to claim 1, wherein the portable information terminal includes the image pickup device, marker detection section, information processing section, and display device, and
the server includes the position/orientation relation calculation section and associated information obtaining section.

6. The information presentation system according to claim 1, wherein the portable information terminal includes the image pickup device, marker detection section, position/orientation relation calculation section, associated information obtaining section, and display device, and
the server includes the information processing section.

7. The information presentation system according to claim 1, wherein the portable information terminal includes the image pickup device, marker detection section, position/orientation relation calculation section, information processing section, and display device, and
the server includes the associated information obtaining section.

8. The information presentation system according to claim 1, wherein the known marker represents three-dimensional information of each installation place in the specific district, and
the identification of the known marker and the calculation of the position and orientation relations are performed based on the three-dimensional information.

9. The information presentation system according to claim 1, wherein the associated information obtaining section functions as an action route calculation section configured to store an order of a plurality of known markers identified in a predetermined period and to calculate and store a user's action route from the stored order of the markers and an arranged position relation of the markers in the specific district.

10. The information presentation system according to claim 1, wherein the server is constituted such that the server handles a plurality of portable information terminals.

11. The information presentation system according to claim 1, wherein the portable information terminal further includes an input device,
the input device and display device function as a destination setting section by which the user of the portable information terminal sets a desired destination,
the predetermined information associated with the known marker is image data for indicating a movement direction, and
the processing of the predetermined information comprises: processing the image generated by the image data for indicating the movement direction based on a route to the destination set by the destination setting section from the disposed position of the marker, and a direction of the image pickup device judged by the calculated position and orientation relations to generate a guide image indicating the movement direction to the destination.

12. The information presentation system according to claim 1, wherein the associated information obtaining section functions as an image storage section configured to store the image photographed by the image pickup device together with photographing information including at least a photographing date and a photographing place identified by the disposed position of the identified known marker in the specific district.

13. The information presentation system according to claim 1, wherein the associated information obtaining section includes:
a function of an image storage section configured to store the image photographed by the image pickup device together with photographing information including at least a photographing date and a photographing place identified by the disposed position of the identified known marker in the specific district; and
a function of a download section configured to allow a photographer to download the image and photographing information stored in the image storage section via Internet.

14. The information presentation system according to claim 1, wherein the portable information terminal further includes an input device,
the input device and display device function as a schedule setting section by which the user of the portable information terminal sets a schedule of the day,
the associated information obtaining section functions as a schedule storage section configured to store the schedule set by the schedule setting section, and
the display device displays the schedule stored in the schedule storage section in response to an operation of the input device by the user.

15. The information presentation system according to claim 14, wherein the associated information input section functions as a schedule management section configured to collate the schedule stored in the schedule storage section, the current time, and a place which is identified by the disposed position of the identified known marker in the specific district and in which the user of the portable information terminal exists with one another and to display information based on a difference from the schedule, obtained by the collating, in the display device.

16. The information presentation system according to claim 1, wherein the associated information obtaining section is constituted such that the associated information obtaining section performs radio or cable communication with a facility existing in the specific district,
the associated information obtaining section functions as a management section configured to store and manage specific district information including at least one of installed position information of the marker in the specific district, a use situation and reservation situation obtained by the communication with the facility, the situation of the reservation into the facility by the user of the portable information terminal, and an action record of the user in the specific district, and
the display device is constituted such that the specific district information stored/managed by the management section is appropriately browsed.

17. The information presentation system according to claim 1, wherein at least one of a plurality of attractions and a plurality of events exist in the specific district,
the associated information obtaining section functions as a waiting time storage section configured to store information on a participation waiting time of at least one of each attraction and event at the current time, and
the display device is constituted such that the information on the waiting time stored in the waiting time storage section is browsed.

18. The information presentation system according to claim 1, wherein at least one of a plurality of attractions and a plurality of events exist in the specific district, the portable information terminal further includes an input device, the input device and display device function as a designation section configured to designate a plurality of places of at least one of a desired attraction and event in at least one of each attraction and event, the associated information obtaining section functions as a schedule generation section configured to generate a recommended schedule for an efficient tour in response to the designation of at least one of the attraction and event in each of the plurality of places by the designation section, and the display device displays the recommended schedule generated by the schedule generation section.

19. The information presentation system according to claim 1, wherein a facility which includes a radio or cable communication function with the associated information obtaining section and which is able to be reserved exists in the specific district, the portable information terminal further includes an input device, and the associated information obtaining section functions as:
a facility management section configured to store information indicating a use situation of the facility, obtained by the communication with the facility and to make or cancel a reservation with respect to the facility, and
a reservation section configured to display the information indicating the use situation of the facility stored in the facility management section in the display device in accordance with a user's operation of the input device and to allow the facility management section to make or cancel the reservation of the facility in accordance with the user's operation of the input device.

20. The information presentation system according to claim 1, wherein a sales facility which sells articles that are able to be purchased by the user of the portable information terminal exists in the specific district, the portable information terminal further includes an input device, the associated information obtaining section functions as:
an article management section configured to store list information of the articles and to perform a purchase procedure of the article desired by the user with respect to the sales facility; and
a purchase section configured to display the list information of the articles stored in the article management section in the display device in accordance with the user's operation of the input device and to make a purchase procedure request of the selected article with respect to the article management section in accordance with article selection by the user's operation of the input device, the associated information obtaining section and the sales facility in the specific district are constituted such that a radio or cable communication is possible, and the purchase procedure of the article in the article management section comprises: transmitting one of:
purchase reservation information of the selected article, and
a transfer instruction of the selected article
to a predetermined pick-up position in the specific district to the sales facility of the selected article.

21. The information presentation system according to claim 20, wherein the associated information obtaining section further functions as a card number storage section configured to store a credit card number of a user of the portable information terminal so that a purchase cost of the article is collectively paid via a corresponding credit company by the stored credit card number.

22. The information presentation system according to claim 1, wherein the predetermined information associated with the known marker is image data for indicating a movement direction, a sales facility which sells articles that are able to be purchased by a user of the portable information terminal exists in the specific district, the portable information terminal further includes an input device, the associated information obtaining section functions as an article management section configured to store detailed information including the image, a price, a place of the sales facility, and a display position in the sales facility with respect to each article and to display list information of all the articles including at least the image and price in the detailed information in the display device in response to an article list browse request by an operation of the input device by the user of the portable information terminal, and a processing process of the predetermined information comprises: searching the place and display operation of the sales facility of the selected article from the article management section in response to an article selection instruction by the user; and processing the image generated by the image data for indicating the movement direction based on a route to the display position of the selected article searched from the disposed position of the marker, and a direction of the image pickup device judged by the calculated position and orientation relations to generate a guide image indicating the movement direction to the display position.

* * * * *